Oct. 10, 1933.    H. S. DUELL    1,929,630
LANDING GEAR FOR AIRCRAFT
Filed Sept. 15, 1931    2 Sheets-Sheet 1

INVENTOR.
HOLLAND S. DUELL,
BY Duell, Dunn & Anderson.
ATTORNEYS.

Oct. 10, 1933.　　　H. S. DUELL　　　1,929,630
LANDING GEAR FOR AIRCRAFT
Filed Sept. 15, 1931　　2 Sheets-Sheet 2
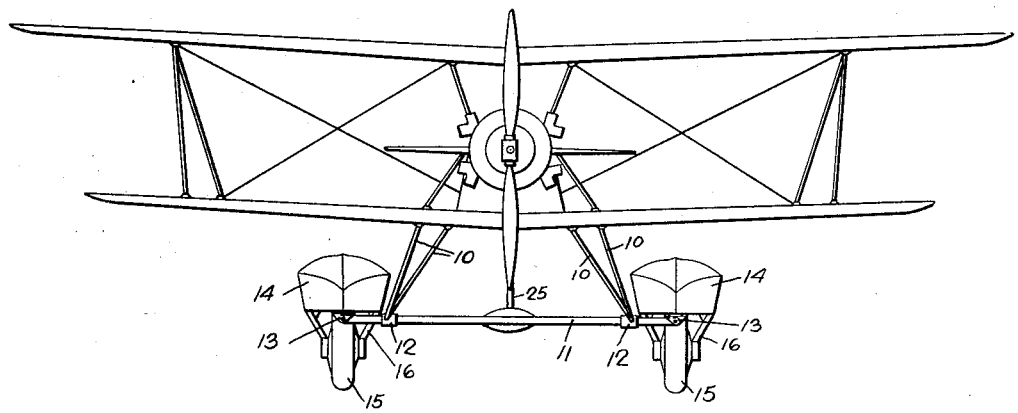
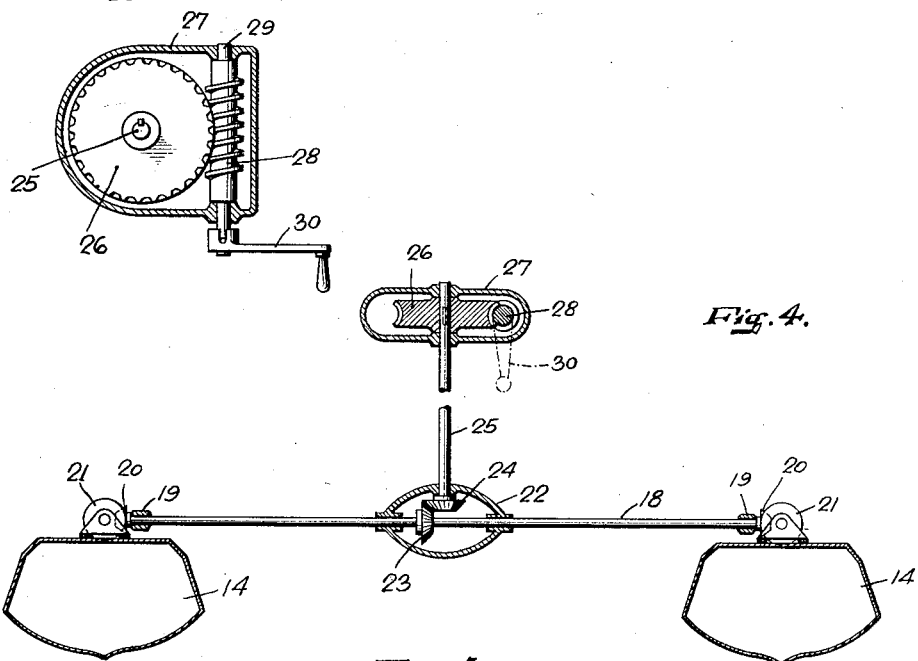
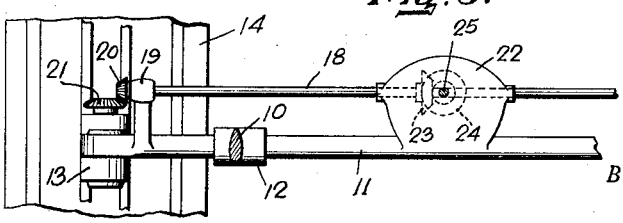
INVENTOR.
HOLLAND S. DUELL,
BY Duell, Dunn & Anderson
ATTORNEYS.

Patented Oct. 10, 1933

1,929,630

UNITED STATES PATENT OFFICE 1,929,630

LANDING GEAR FOR AIRCRAFT

Holland S. Duell, Larchmont, N. Y.

Application September 15, 1931
Serial No. 562,899

9 Claims. (Cl. 244—2)

This invention relates to a structurally and functionally improved landing gear for association with aircraft and particularly for use with so-called "amphibian" type of plane.

It is an object of the invention to provide a landing gear of this type by means of which an airplane may be readily adapted for taking off and/or alighting on either land or water.

A further object of the invention is that of providing a landing gear of this type which may be easily manipulated by the pilot with a minimum degree of effort.

Another object of the invention is that of furnishing a landing gear of the amphibian type which is readily interchangeable with the landing gear of the everyday plane and yet retains the quality of the latter's performance.

A still further object is that of providing a landing gear of the amphibian type which is rigidly maintained in either its water or land position.

Yet another object of the invention is that of furnishing a landing gear of this type, the parts of which will be relatively few in number and individually simple and rugged in construction, these parts being capable of being readily assembled to furnish an apparatus which will operate over long periods of time with freedom from mechanical difficulty.

With these and other objects in mind, reference is had to the attached sheets of drawings illustrating one practical embodiment of the invention, and in which Fig. 1 is a front view of an airplane provided with a landing gear of the type herein described and in which such gear is in position for taking off and alighting on the surface of the water;

Fig. 3 is a front view of the airplane shown in Fig. 1 with the landing gear in position to allow taking off and alighting on land;

Fig. 4 is a cross sectional view of the mechanism which effects transformation of the gear from that suitable for use on land to one for use on water;

Fig. 5 is a top view of the detail of the mechanism shown in Fig. 4, and

Fig. 6 is a top sectional view of a further detail of the mechanism shown in Fig. 4.

Figure 1:
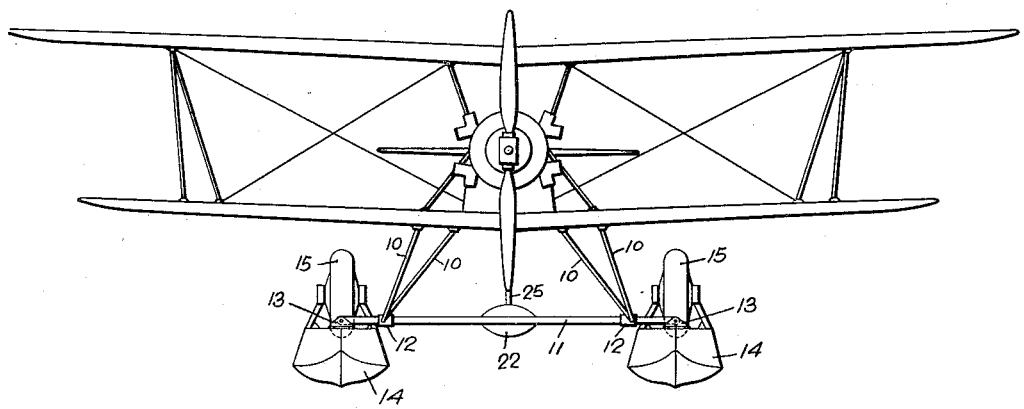
Figure 2:
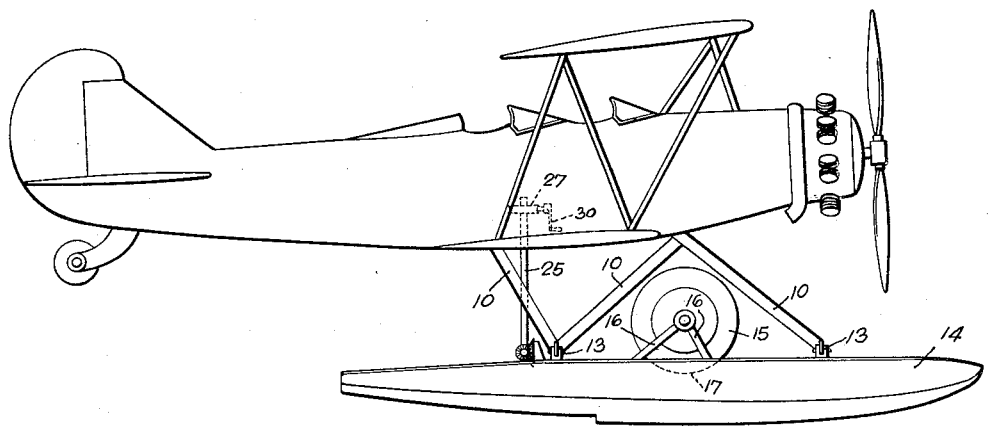
Fig. 2 is a side view of the airplane shown in Fig. 1.

With reference to the several views and particularly to Figs. 1, 2 and 3, a conventional type of airplane is shown which is provided with supporting struts 10 for association with the landing gear. These struts comprise a part of the original equipment of the plane, and it is my intention that they may be utilized without change in connection with my improved type of landing gear. Rigid cross members 11 are associated with the supporting struts by means, for example, of collars 12 which may be securely fastened to the members 11 in any suitable manner. Each outer end of the members 11 is formed with a pivot 13 to which is secured the landing gear. This landing gear comprises pontoons 14 and wheels 15, the latter being secured to the pontoons by means of brace mountings 16.

As shown in Fig. 2, this wheel may be partially recessed within the upper surface of the pontoon, as at 17, depending in part upon the clearance afforded the wheel by the supporting strut members 10. Parallel with and adjacent the rear member 11 is a horizontal shaft 18 which is mounted for rotation in bearing brackets 19. This shaft carries at its outer ends bevel gears 20 which in turn engage bevel gears 21 which are fixedly carried by the pontoons. Near the centre of the shaft 18 is a gear box 22 which is supported by the member 11. Disposed within this box and mounted on the shaft 18 is a further bevel gear 23 which engages a complementary bevel gear 24. This latter gear is mounted on the lower end of a vertical shaft 25 which extends upwardly into the fuselage of the airplane to a point within the pilot's compartment. The upper end of the shaft 25 carries a worm wheel 26 which is enclosed within a casing 27. Associated with the worm wheel is a worm gear 28 mounted on a shaft 29 which has a handle 30 at its one end.

In operating the landing gear described, the pilot grasps the handle 30 and cranks the same, thus transmitting the motion through the shafts 25 and 18 and effecting the rotation of the pontoon and wheel members through an angle of 180° about the pivots 13. By this means the pilot may render operable either the wheels or pontoons so as to be able to effect a landing on water or land. It will be noted that the mechanism illustrated is effective in locking the landing gear in either position, and that an accidental disturbance of the parts cannot occur.

It is of course apparent that the exact proportions and arrangement of parts will vary in different types and designs of planes and that other practicable mechanisms for manipulating the landing gear from a land to water position might be employed. The angular relation between the wheels and pontoons might be varied. So also a source of motive power might be used to supplant the handle 30 and effect a rotation of the parts.

It will further be understood that other changes in construction and rearrangements of the parts might be resorted to without departing from the scope of the invention, as defined by the claims.

Having described my invention, what I claim as new and desire to secure by Letters Patent, is:

1. A landing gear of the amphibian type for association with an airplane, comprising a pontoon member and a wheel member, both of said members being pivoted at a central point, and means for moving either of said members through an arc of at least 180° into operating position.

2. A landing gear of the type described including, in combination, a plurality of pontoon members, a plurality of wheel members associated therewith, each of said wheel members and pontoon members being pivoted about a central point, and means for moving either of the same through an arc of at least 180° into operating position.

3. A landing gear of the amphibian type, comprising a plurality of pontoon members, a plurality of wheel members carried thereby, said pontoon members and wheel members being mounted on a common pivot and the center of the contact surface of each of said members being located in a perpendicular plane extending through said pivot whereby the positioning of one of the same in operating relationship automatically effects the withdrawal of the other from such position.

4. A landing gear of the character described, comprising a rigid cross member for association with the supporting struts of an airplane, a plurality of pontoons pivoted to said cross member, wheels carried by said pontoons, and means for rotating said pontoons about said pivots through an arc of at least 180° so as to withdraw the same from operating position whereby said wheels are rendered operable.

5. A pontoon for association with a landing gear of an airplane, comprising a body portion, a plurality of supporting members connected to the top surface thereof, and a wheel carried by said members, the center of the contact surface of said wheel and pontoon being located in the same perpendicular plane.

6. A pontoon for association with the landing gear of an airplane, comprising a body member formed with a recess in the top surface thereof, supporting members mounted adjacent said recess, and a wheel carried by said supporting members and extending into said recess, the center of the contact surface of said wheel and pontoon being located in the same perpendicular plane.

7. A landing gear of the character described including, in combination, a rigid cross member for association with the supporting struts of an airplane, a plurality of pontoons pivotally mounted on said cross member, landing wheels carried by said pontoons, a horizontal shaft disposed adjacent said cross member, gears carried by said shaft adjacent each end thereof, complementary gears fixedly carried by said pontoons and engaging said first named gears for rotating said pontoons about said pivots through an arc of at least 180° so as to withdraw the same from operating position whereby said wheels are rendered operable.

8. A landing gear of the character described including, in combination, a rigid cross member for association with the supporting struts of an airplane, a plurality of pontoons pivotally mounted on said cross member, landing wheels carried by said pontoons, a horizontal shaft disposed adjacent said cross member, gears carried by said shaft adjacent each end thereof, complementary gears fixedly carried by said pontoons and engaging said first named gears, and means for rotating said pontoons about said pivots so as to withdraw the same from operating position whereby said wheels are rendered operable, said rotating means effecting a locking of the parts when in operating position.

9. A landing gear of the character described including, in combination, a plurality of pontoon members, a plurality of wheel members carried thereby, means for selectively bringing said pontoon members or wheel members into operating position by rotation through an arc of at least 180°, and means cooperating with said actuating means for locking either of said members against further movement.

HOLLAND S. DUELL.